United States Patent [19]
Demura

[11] Patent Number: 5,469,273
[45] Date of Patent: Nov. 21, 1995

[54] DECODING SYSTEM HAVING PARALLEL-PROCESSING CAPABILITY THEREIN

[75] Inventor: Tatsuhiko Demura, Kanagawa, Japan

[73] Assignee: Kabushiki Kaisha Toshiba, Kawasaki, Japan

[21] Appl. No.: 184,920

[22] Filed: Jan. 24, 1994

[30] Foreign Application Priority Data

Jan. 22, 1993 [JP] Japan ..................................... 5-009021

[51] Int. Cl.$^6$ ..................................................... H04N 1/41
[52] U.S. Cl. ............................................. 358/426; 382/232
[58] Field of Search ..................................... 358/426, 427, 358/261.1–261.4, 262.1, 466, 467; 375/122; 382/56; 341/67

[56] References Cited

U.S. PATENT DOCUMENTS

4,276,544  6/1981  Iinuma ....................................... 341/67

Primary Examiner—Edward L. Coles, Sr.
Assistant Examiner—Jerome Grant, II
Attorney, Agent, or Firm—Foley & Lardner

[57] ABSTRACT

An image data decoding system for processing compressed data including variable-length codes and fixed-length codes in digital code series, capable of significantly reducing overall data processing time duration and also reducing a size and scale for a circuit therefor. The image data processing system includes: extracting portion which extracts the variable-length code and the fixed-length code from the digital code series; a processor which processes data based on a value obtained from the digital code series; a self-running decoder which starts to decode the variable-length codes in parallel with data processing in the processor, upon receipt of a start signal from the processor; compare unit which compares the variable-length code and the condition for stopping self-running decoding decoder; and image reconstructing unit which reconstructs image in accordance with a plurality of parameters obtained from the processor and the self-running decoder.

9 Claims, 5 Drawing Sheets

DECODING SYSTEM HAVING PARALLEL-PROCESSING CAPABILITY THEREIN

BACKGROUND OF THE INVENTION

1. Technical Field

The present invention relates to a decoding apparatus which decodes a signal mixedly composed of a variable-length code and a fixed-length code, where the codes are utilized to transfer and record a digital image signal.

2. Background Art

Recently, a signal compression technique is widely used for transmitting and recording sound and image in the form of digital signal. For example, signal compression or data compression in a computer is carried out such that sizes for various files are made small by compressing data in the files. Thereby, communication time and telephone bills are reduced. In other words, cost incurred in storage and communication therefor is cut down to a certain degree. Since there is a huge amount of information necessary for a motion image, a highly efficient coding is indispensable for the digital transmission and memory. Typical techniques utilized in such a highly efficient coding in recent years are a orthogonal transform, run-length technique, a variable-length coding, a motion compensation and so on.

Particularly, the variable-length coding is widely in use since it can execute a reversible coding with a less amount of codes. In a coding standard for carrying out the transmission and record, it is often practiced that the variable-length codes and the fixed-length codes are mixed in a communication stream.

In a case where various types of coding methods are handled and the coding method has several modes, such a coding need be programmable. In the conventional practice, when a rate of the compressed codes is slow, decoding therefor is executed by a microprocessor where a program therefor is rather easy. Moreover, in a case where a software processing by the microprocessor is not sufficient, the decoding is carried out for each code word by utilizing a block for exclusive use with the decoding of the variable-length code, under control of the microprocessor.

Figure 1:
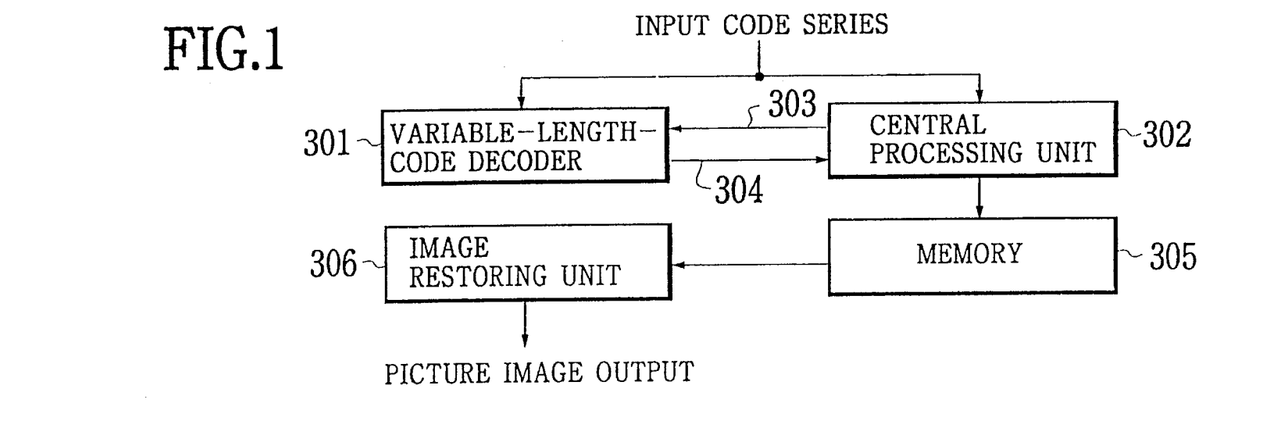
FIG. 1 is a block diagram showing a decoding apparatus which is generally utilized.
Figure 2:
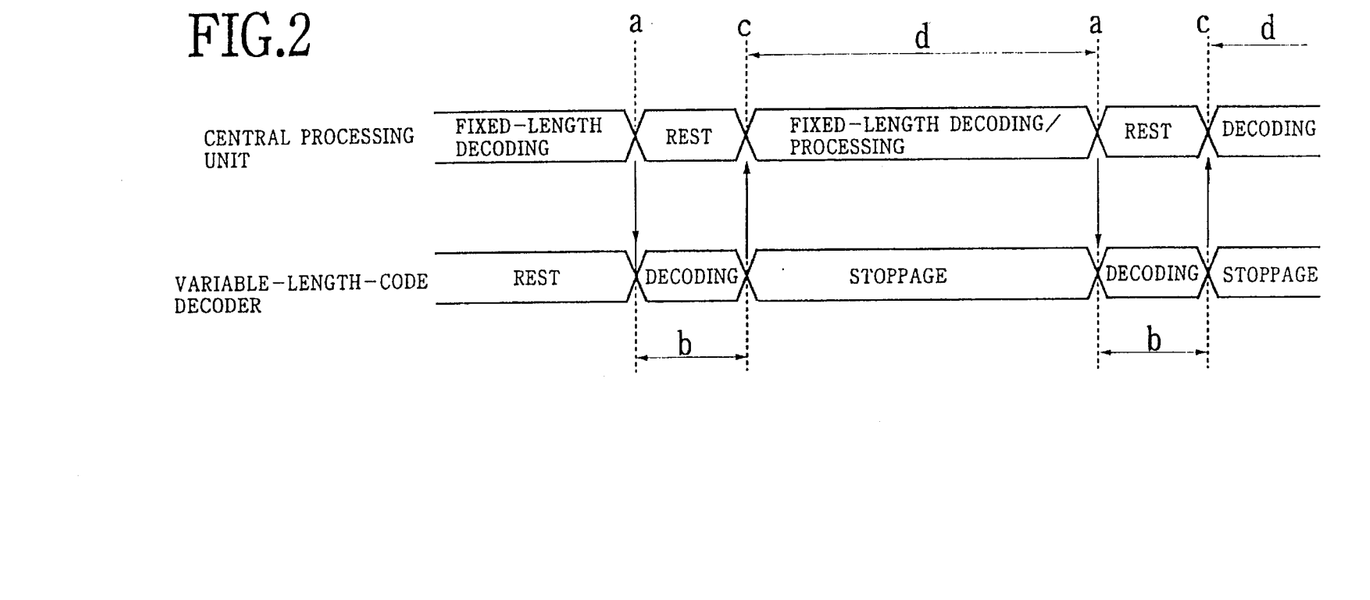
FIG. 2 shows an operation procedure in the form of timing charts for central processing unit 302 and variable-length code decoder 301 shown in FIG. 1.

FIG. 1 is a block diagram where the decoding is exclusively executed. FIG. 2 shows a operation procedure for the block shown in FIG. 1.

In the method shown in FIG. 1, variable-length-code decoder 301 serves as an accelerator for central processing unit 302. In central processing unit 302, the fixed-length codes are extracted, and a vector calculation is carried out for the motion compensation. Operation for this conventional technique is described below.

When variable-length-code decoder 301 is activated by an instruction from central processing unit 302, central processing unit 302 sends out a start signal 303 and a table selection signal to variable-length-code decoder 301 so that the fixed-length-code decoding is stopped (indicated with a in FIG. 2).

When the variable-length-code decoder 301 receives the start signal 303 from the central processing unit 302, the variable-length codes are decoded from a head of an input code based on the table selection signal (indicated as b in FIG. 2). When variable-length-code decoder 301 terminates a processing, end signal 304 and a code length which is decoded upon the variable-length code are sent to central processing unit 302 (indicated with c in FIG. 2). When central processing unit 302 receives end signal 304, central processing unit 302 forward the input code by the code length and resumes an instruction execution (indicated with d in FIG. 2).

In the above-mentioned technique, since variable-length-coded image data exist continuously in a code where the image signal and so on are compressed, the central processing unit 302 is stopped all the while the variable-length-coded image data exist. As a result thereof, data processing can not be completed within a desirable time period.

In a coding method which satisfies a current television broadcast standard and a high-definition television standard, an operational rate of decoder 301 and a pixel rate are almost same. For example, in a worst condition where pixel data as the variable-length code exist for as much as the number of pixel, the decoding can not be executed in a real time basis due to an overhead necessary for decoding the fixed-length code, calculating the motion vectors and for transferring the instructions to and from variable-length-code decoder 301.

There is also available a technique where variable-length-code decoder 301 executes a syntax interpretation and the decoding of the variable-length codes for a particular section in which the variable-length codes exist continuously. In this technique, there need be a plurality of circuits for the syntax interpretation when there are plural syntaxes such as a case where there are several different modes and various types of coding methods. Thereby, the number of variable-length-code decoders 301 are increased, so that there is caused a problem where an overall circuit scale is undesirably enlarged.

As described above, the decoding process is not performed in the real time basis and the size for the circuit is undesirably enlarged in the conventional decoding apparatus.

SUMMARY OF THE INVENTION

In view of the foregoing drawbacks, it is therefore an object of the present invention to make possible that the variable-length code decoding means is simultaneously operated until a predetermined completion condition is met while the central processing unit is simultaneously operated to process data in parallel with the variable-length code decoding means. As a result, overall data processing time is significantly reduced and the circuit size and scale is minimized.

Another object of the present invention is to provide a decoding system which can handle a case where a control data includes mixture of the variable-length code and the fixed-length code.

According to one aspect of the present invention, there is provided an image decoding system for processing compressed data including a series of variable-length codes and fixed-length codes in digital code series where the system comprises: extracting means for extracting the variable-length code and the fixed-length code from the digital code series; process means for extracting a start information from the fixed-length code, for generating a start signal therefrom and for processing data based on a value obtained from the digital series; self-running decoding means for activating to decode the variable-length codes in parallel with data processing in the process means, upon receipt of the start signal generated from the process means; compare means for comparing the variable-length code and a condition for stopping self-running decoding means; and image reconstructing means for reconstructing image in accordance with a plurality of parameters obtained from the process means and the self-running decoding means.

According to another aspect of the present invention there is provided an image reconstructing system for decoding mixture of variable-length codes and fixed-length codes, in which the system comprises: data input portion for further inputting a header and continuous variable-length codes where the header therein is comprised of fixed-length codes and a plurality of single variable-length codes; calculating means, connected to the data input portion, which processes a control data including the header; and self-running decoding means, connected to the data input portion, for activating to decode the series of variable-length codes, upon receipt of a start signal generated from the calculating means, wherein the calculating means sends to the self-running decoding means a signal which instructs to decode the single variable-length code, and wherein the self-running decoding means sends to the calculating means a resultant value of the single variable-length code decoded by the self-running decoding means.

BRIEF DESCRIPTION OF THE DRAWINGS

These and other objects, features and advantages of the present invention will become more apparent from the following description of the preferred embodiment taken in conjunction with the accompanying drawings, in which.

DETAILED DESCRIPTION OF THE PREFERRED EMBODIMENTS

Features of the present invention will become apparent in the course of the following description of exemplary embodiments which are given for illustration of the invention and are not intended to be limiting thereof. Embodiments of the present invention will now be described with reference to the drawings.

Figure 3:
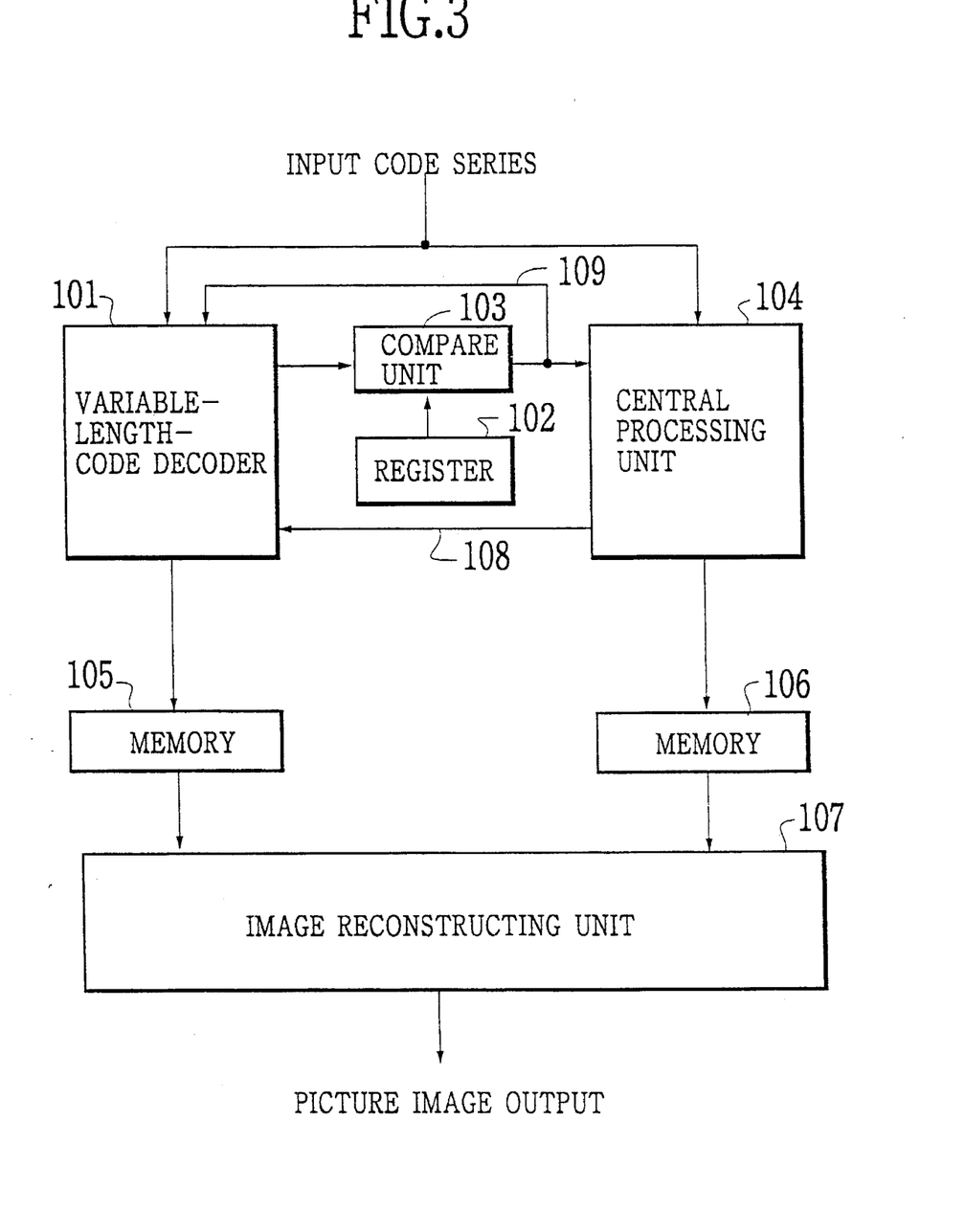
FIG. 3 is a block diagram showing a decoding system according to the first embodiment of the present invention.

FIG. 3 is a block diagram showing a decoding system according to the first embodiment of the present invention.

In this first embodiment, a moving picture is compressed by a discrete cosine transform (DCT) and a motion compensation (MC) and such a compressed code series is transmitted. The code series are composed of a fixed-length code in which a motion vector obtained from the motion compensation is divided into several reconstructable parameters, and a run-length code of a discrete cosine coefficient expressed by a variable-length code.

Referring to FIG. 3, the decoding system comprises:

(1) variable-length-code decoder 101 by which the variable-length code is extracted from the continuous code series so as to be decoded to the fixed-length code;

(2) register 102 which stores an end code of the discrete cosine coefficient included in the code series;

(3) compare unit 103 in which the end code stored in register 102 and the code series are compared;

(4) central processing unit 104 in which the fixed-length code is extracted from the code series, and data are processed based on values obtained from the code series;

(5) first memory 105 which stores the discrete cosine coefficients;

(6) second memory 106 which stores several parameters such as motion vectors;

(7) image reconstructing unit 107 which reconstructs the image from various parameters such as discrete cosine coefficients and motion vectors transmitted from first and second memories 105, 106;

(8) start signal 108 which is instructed from central processing unit 104 to variable-length-code decoder 101; and (9) end signal 109 which is instructed from compare unit 103 to central processing unit 104 and variable-length-code decoder 101.

A value corresponding to a code indicating completion of discrete cosine transform coefficient is stored in register 102 from an external portion, in advance of activation of central processing unit 104 and variable-length-code decoder 101. Externally input code series are input to variable-length-code decoder 101 and central processing unit 104. The fixed-length codes included in the code series are decoded by an internal program of central processing unit 104, and then various parameters such as the motion vectors are stored in second memory 106.

When the program recognizes that a next parameter of the code series is a discrete cosine transform coefficient, the program in central processing unit 104 sends to the variable-length-code decoder 101 a start signal 108 so that the code series from the next on are decoded as the variable-length codes. While the variable-length-code decoder 101 decodes the code series sent from the central processing unit 104, the central processing unit 104 simultaneously reconstructs the motion vectors and processes other parameters and so on.

Variable-length-code decoder 101 starts to extract the variable-length codes from the data series given from central processing unit 104 and decodes them into the fixed-length codes, and stores the discrete cosine transform coefficients to first memory 105.

Compare unit 103 compares the next code with the value stored in register 102. When the next code is not a completion code of the discrete cosine transform coefficient, variable-length-code decoder 101 continues to decode the next code. When the next code is the completion code, compare unit 103 outputs end signal 109, so that operation of the variable-length-code decoder 101 is stopped. Simultaneously, compare unit 109 outputs to central processing unit 104 the end signal 109 indicating that the decoding of the discrete cosine transform coefficients is completed.

Hereinafter, the discrete cosine transform coefficient may be abbreviated as DCT coefficient. Central processing unit 104 may be abbreviated and simply referred to as processor, while the variable-length-code decoder 101 may be simply referred to as VLD.

When central processing unit 104 is given the end signal 109 indicating that the decoding of DCT coefficient is completed, an interrupt processing is started, so that a processing which processor 104 has then been carrying out is stopped. In the interrupt processing, processor 104 sends the start signal 108 to the VLD 101 when a next code is the DCT coefficient; thereafter, the processor 104 resumes the original processing which had been carried out.

Moreover, when the next code is not the DCT coefficient, the interrupt processing is stopped and the original processing is resumed. In image reconstructing unit 107, picture image is reconstructed from the motion vectors and other parameters reconstructed by the processor 104 and DCT coefficients. Such a reconstructed picture image is output externally therefrom.

Figure 4:
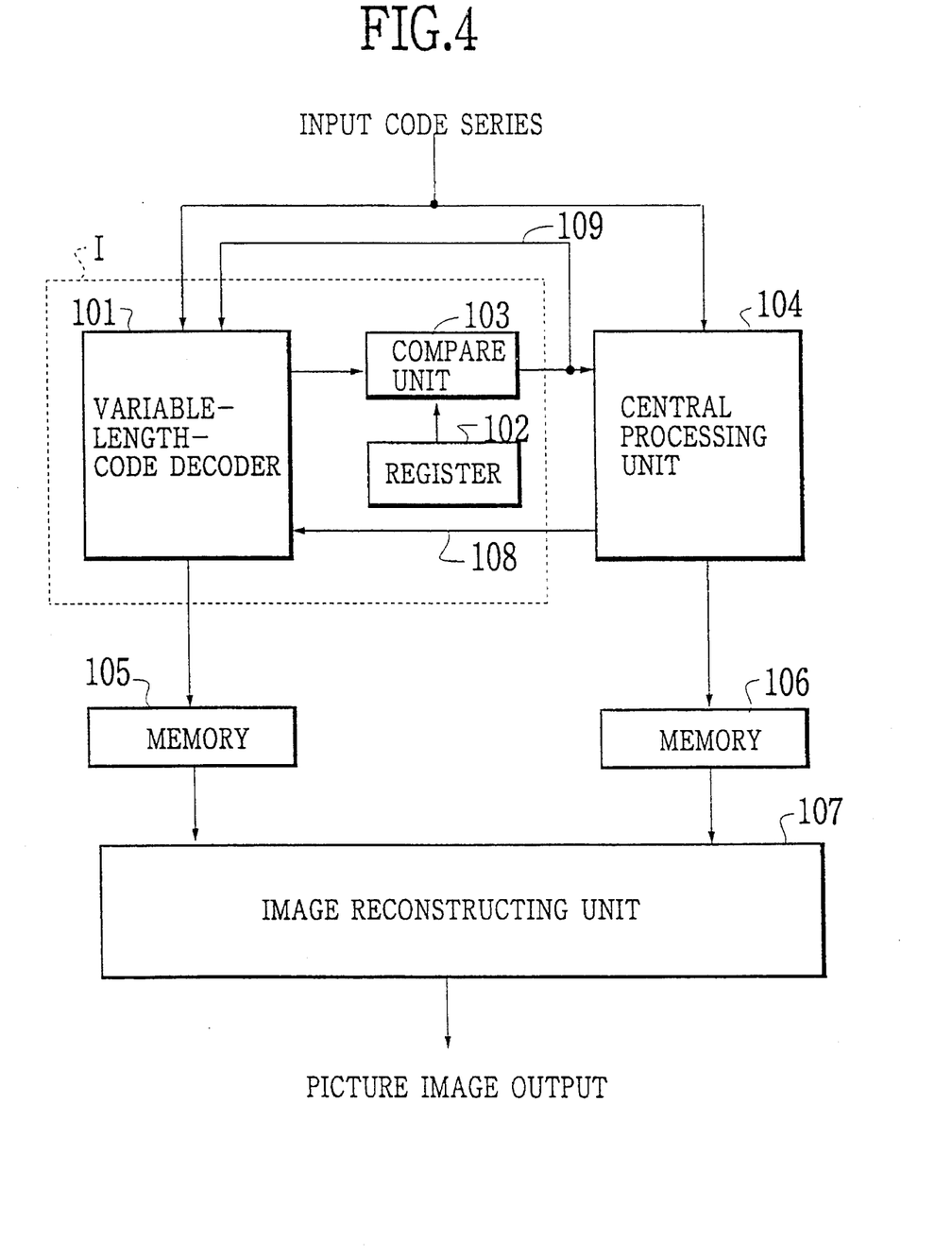
FIG. 4 is a variation of configuration for the decoding system shown in FIG. 3, in which variable-length code decoder (VLD), compare unit and register are integrated as one unit (enclosed by dotted line I).

Referring to FIG. 4, configuration may be such that VLD, compare unit and register may be integrated as one unit enclosed by dotted line I.

In the above-described construction, when the variable-length code is input to the processor that serves as means for processing data, a start signal is given from the processor to VLD which decodes the variable-length code in a self-running manner and in parallel with the processor. The variable-length code prior to decoding thereof, and the predetermined stoppage condition are compared by the compare unit. Meantime, the VLD self-runs itself, or executes operation thereof simultaneously and in parallel with the processor, until the stoppage condition is met.

Accordingly, while the VLD decodes the codes, the processor can process data simultaneously. In other words, the reconstruction of motion vectors by the processor and the decodings of DCT coefficients by the VLD are performed in parallel. Therefore, by employing the above-described task sharing technique, time necessary for overall processing is significantly reduced and the program therefor can be simplified.

Next, described below is a case where codes series processed by the present invention is decoded according to MPEG standard. Moving Picture Expert Group or MPEG is an international standard for stored media moving picture coding. In addition to the earlier version utilizing the motion compensation (MC), in MPEG there is added a predictive structure called B-Picture or bidirectional prediction in terms of time. In the earlier standardization of moving picture coding especially for communication such as a telephonic television, DCT and MC are combined in an optimal manner where the DCT takes care of reducing volumes for spatial information and the MC does for reducing time-oriented information.

MPEG1 is directed to the coding up to approximately 1.5 Mbps, while in MPEG2 a bit rate therefor is set to around 5 Mbps with maximum of 10 Mbps.

Figure 5:
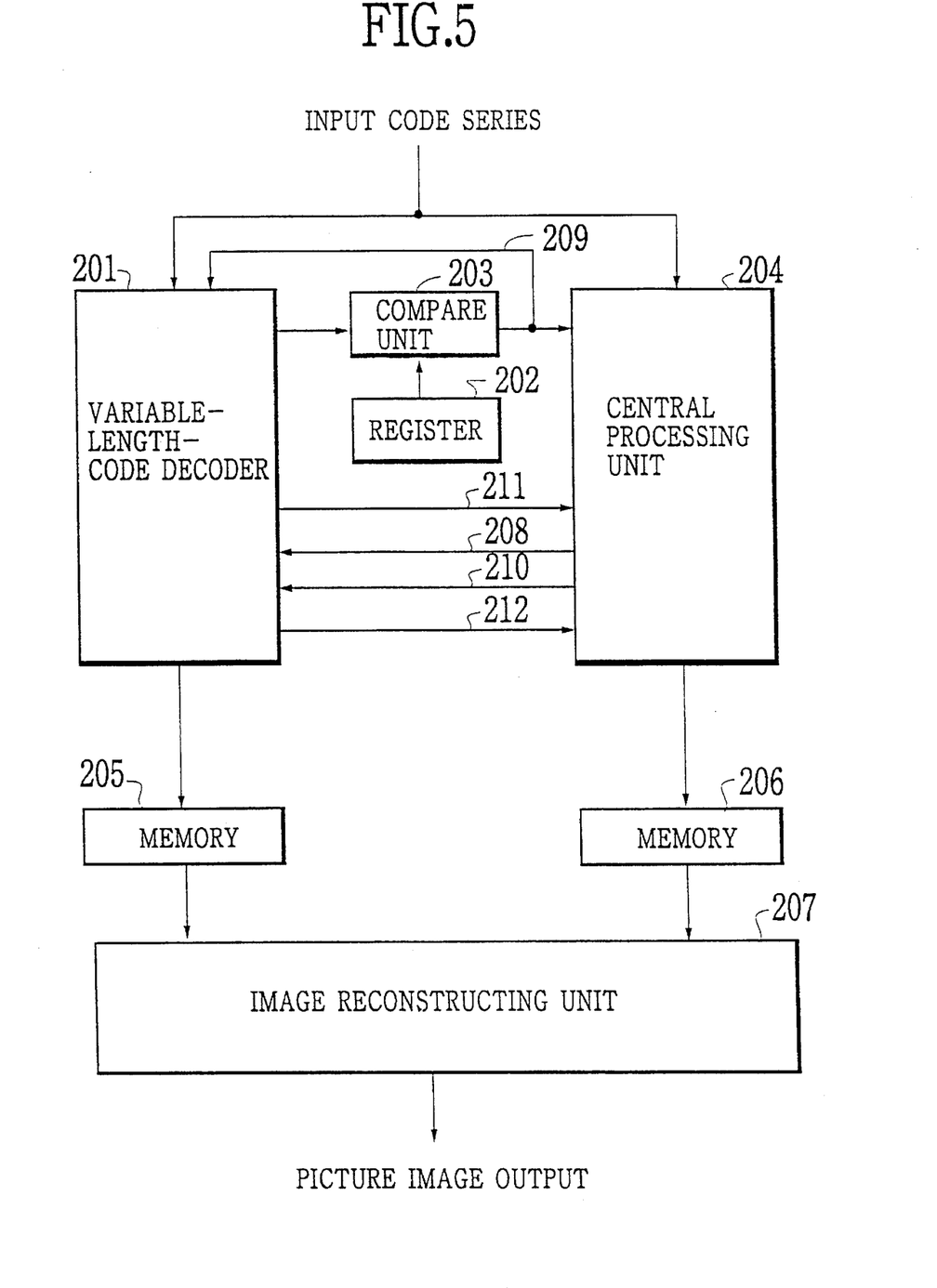
FIG. 5 is a block diagram showing another decoding system according to the second embodiment of the present invention.

In the image reconstructing system according to the the present invention, compressed data are processed in a self-running manner. The data include a series of variable-length codes and fixed-length codes in digital series where the variable-length code has an end information to be be decoded at an end portion of the series of the variable-length code, and the fixed-length code has a start information to be decoded. In the second embodiment, there is provided a data input portion for further inputting a header and a continuous variable-length codes where the header therein is comprised of fixed codes and a plurality of single variable-length codes. There exist the single variable-length codes at plural locations in the header. In other words, in the header there are several single-variable-length codes, therefore, each single variable-length code exists between the fixed-length codes in the header. A code series are output to both processor 204 and VLD 201 from this data input portion.

In comparison to the above embodiment shown in FIG. 3 and FIG. 4, in this another embodiment shown in FIG. 5, there are newly added signal 210 connected from the processor 204 to VLD, and signal 212 sent from VLD 201 to processor 204. The signal 210 is a signal for decoding a single variable-length code which is utilized in the course of decoding a header portion. The signal 212 contains a result of the signal 210. It is to be noted that the system according to the second embodiment can also perform the data processing as described in the first embodiment.

The code series are input to both processor 204 and VLD 201. In each layer of sequence, gop (group of picture) and picture in the code series, there does not exist the variable-length code therein, so that the fixed-length codes are processed in the processor 204. Thus decoded data are stored in memory 206.

The variable-length codes within a macroblock are not continuous ones. Therefore, when a next code is the variable-length code, processor 204 gives VLD 201 the signal 210 by which a single variable-length code is decoded, and the processor 204 stops momentarily the operation thereof. VLD 201 performs the decoding of the single variable-length code, and the decoded result is transferred to processor 204 by means of the result signal 212 or the completion signal 211.

Then, processor 204 receives the decoded result 212 and the completion signal 211 from VLD 201, stores the decoded result 212 in memory 206, and resumes the next fixed-length code. In a block layer, a DC component of an intra macroblock is transmitted in the fixed-length code, whereas an AC component of the intra macroblock is transmitted as the variable-length code which is the run-length code.

Except a case where the image data exist continuously as the variable-length code, data on, for example, motion vectors in the syntax of MPEG standard are variable-length coded in the macroblock layer. This variable length code in the macroblock layer is not continuous, therefore there is necessitated the signal 210 which decodes a single variable-length code. It is to be noted that the macroblock layer exists in the header portion.

The variable-length code series is stopped by a code that is a completion code eob, where eob represents an end of block. The Intra macroblock in MPEG1 and MPEG2 standards is defined to be a compression coding of a block that uses information only from that block. As for the run-length code, suppose that a certain code series is

00000000500000000000900 . . . .

where 5 appears after eight zeroes and then 9 appears after twelve zeroes. In this system of zero-run coding,

| run | level |
| --- | --- |
| 8 | 5 |
| 12 | 9 | where the code is formed by combining the run and the level.

In a non-intra macroblock, a difference value with respect to a reference picture is transmitted by the motion compensation. The difference value is transmitted by the run-length code serving as the variable-length code. The non-intra macroblock in MPEG1 and MPEG2 standards is defined to be a coding of a block that uses information both from itself and from block occurring at other times. In this case, the cob codes are stored beforehand in register 202 which stores the end codes. The DC component is decoded in the processor 204.

Thereafter or in case of the intra macroblocks, the variable-length codes will be transmitted continuously, the processor sends to VLD 201 the start signal 208 by which the codes are decoded in a self-running manner in VLD in parallel with the operation at processor 204. Then, processor 204 reconstructs motion vectors and decodes the next codes and so on.

On the other hand, VLD 201 decodes the variable-length codes, the decoded results are stored in memory 205 when the next code is the end code, and decodes the next codes. VLD sends back the end signal 209 to the processor 204 when the next code is the end code.

Then, though the processor 204 is in the midst of executing other processing, the processor 204 starts to perform the interrupt processing as the end signal 209 is regarded as an interrupt signal. In the interrupt processing, the processor instructs VLD 201 to again decode such variable-length codes by the start signal 208 if there exist a series of continuous variable-length codes afterwards.

Figure 6:
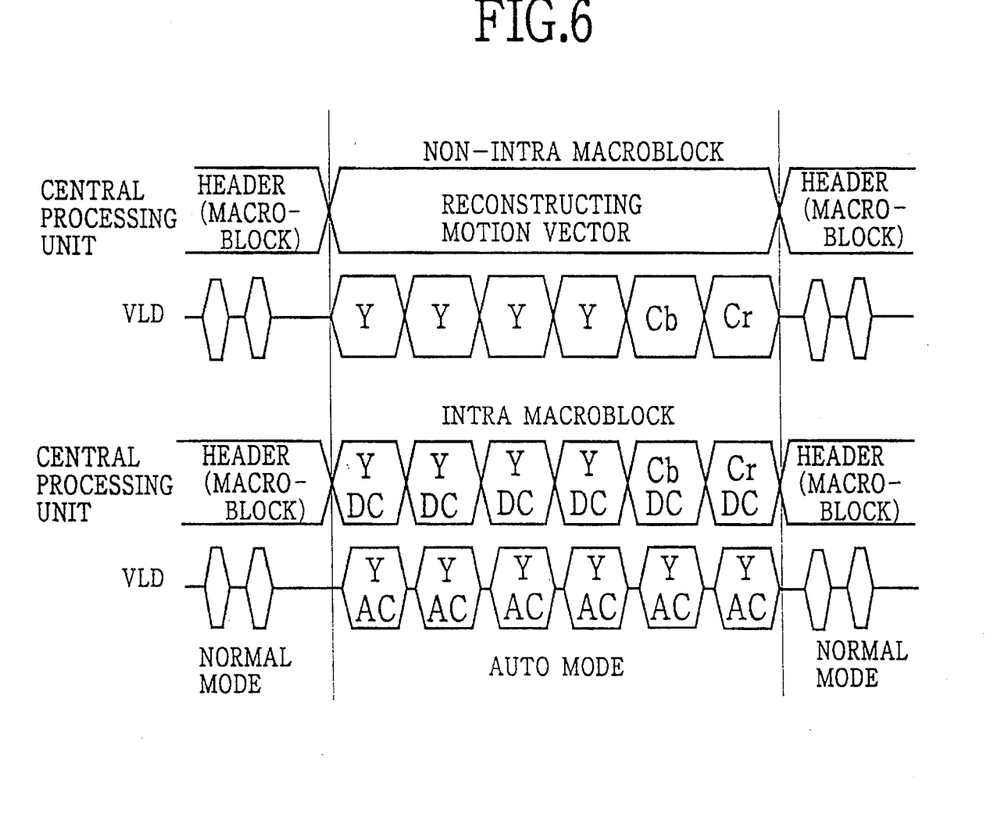
FIG. 6 are operational procedures in the form of timing charts for processor (central processing unit) and VLD (variable-length code decoder) according to the present invention.

FIG. 6 shows parallel operations of the processor 204 and the VLD 201 in the form of timing charts. FIG. 6 is now described in detail.

The central processing unit decodes the fixed-length code existing in a hierarchical structure comprising a sequence header, a GOP layer, a picture layer and a macroblock layer. Moreover, the central processing unit performs the decoding operation, while it generates the signal 210 for instructing to decode a single variable-length code, to the VLD. In the block layer, the motion vector is reconstructed based on data decoded in the macroblock, in a case of the non-intra macroblock. Simultaneously, the signal 208 is sent to VLD 201 so that the VLD 201 self-runs to decode a plurality of variable-length codes. In a case of the intra macroblock, a DPCM (difference pulse code modulation) processing is performed by the central processing unit since a DC component of pixel data is DPCM-processed. In parallel with the DPCM processing, an AC component of the pixel data which are variable-length codes are decoded.

With reference to FIG. 6, since the motion vector reconstruction for inter-picture coded macroblocks and a decoding the DCT coefficient for intra-picture coded macroblock is possible to perform exclusively, an amount of calculations is optimally balanced. Consequently, a task sharing technique, or the parallel operating technique at the processor and the VLD employed in this invention can achieve both flexible bistream interpretation and high speed decoding.

In summary, the decoding system of the present invention is characterized by providing the self-running or parallel-performing means for exclusively executing decodings of the variable-length codes, means for setting the completion condition and the compare means for comparing the completion condition and the code series. Thereby, during the decodings of the variable-length codes, the other data is simultaneously processed, so that the processing time therefor can be significantly reduced and the size and scale for circuit therefor can be reduced.

Besides those already mentioned above, many modifications and variations of the above embodiments may be made without departing from the novel and advantageous features of the present invention. Accordingly, all such modifications and variations are intended to be included within the scope of the appended claims.

What is claimed is:

1. An image decoding system for processing compressed data including a digital code series comprising successive variable-length codes and successive fixed-length codes where the successive variable-length codes have an end information at an end portion of the successive variable-length codes and the successive fixed-length codes have a start information just before a start portion of the successive variable-length codes, the system comprising:

extracting means for extracting the successive variable-length codes and the successive fixed-length codes from the digital code series;

process means for processing the compressed data and for extracting the start information to generate a start signal;

self-running decoding means for decoding the variable-length codes upon receipt of the start signal;

compare means for comparing the variable-length codes with a predetermined value and for stopping the self-running decoding means to output an end signal to the process means when a variable length code equals the predetermined value;

image reconstructing means for reconstructing an image in accordance with a plurality of parameters obtained from the process means and the self-running decoding means, wherein the process means reconstructs a motion vector and processes other parameters based on the compressed data, simultaneously with the decoding process by the self-running decoding means, and wherein the compare means outputs an end signal upon receipt of said end information.

2. The system of claim 1, further comprising: register means, connected to the compare means, for storing said predetermined valve to stop the self-running decoding means.

3. An image decoding system for processing compressed data including a series of variable-length codes and fixed-length codes in digital code series where the variable-length code has an end information to be decoded at an end portion of the series of the variable-length code and the fixed-length code has a start information to be decoded, the system comprising:

processor means for processing programmable apparatus wherein the digital input code series is input thereto;

self-running means in which the input code series is input, and the variable-length code that represents a process data portion having an image signal in the digital code series is decoded;

register means for storing an end signal attached to the variable-length code that represents the process data portion in the input code series; and compare means in which a value from the variable-length code decoding means and a value from the register means are compared so that an instruction to stop operations is dispatched therefrom to the variable-length code decoding means and the processor means when both values are matched, wherein the processor means provides to the variable-length code decoding means a start signal which instructs to start processing data having the variable-length code.

4. The system of claim 3, further comprising:

first memory means, electrically connected to the processor means, for storing a plurality of parameters including motion vectors that are necessary for compressing the image;

second memory means, electrically connected to the variable-length code decoding means, for storing discrete cosine transform coefficients that are necessary for compressing the image; and image reconstructing means for reconstructing the image based on the plurality of parameters transferred from the first memory means and the second memory means.

5. An image reconstructing system for processing compressed data including a series of variable-length codes and fixed-length codes in digital code series where the variable-length code has an end information to be decoded at an end portion of the series of the variable-length code and the fixed-length code has a start information to be decoded, the system comprising:

data input portion for further inputting a header and continuous variable-length codes where the header therein is comprised of fixed-length codes and a plurality of single variable-length codes in which there exist the single variable-length codes at plural locations in the header, and for outputting such data externally therefrom;

calculating means, connected to the data input portion, which processes a control data including the header comprised of the fixed-length and the plurality of the single variable-length codes;

self-running decoding means, connected to the data input portion, for activating to decode the series of variable-length codes, upon receipt of a start signal generated from the calculating means; and wherein the calculating means sends to the self-running decoding means a signal which instructs to decode the single variable-length code, and wherein the self-running decoding means sends to the calculating means a resultant value of the single variable-length code decoded by the self-running decoding means.

6. The system of claim 5, further comprising:

first memory means, electrically connected to the calculating means, for storing a plurality of parameters including motion vectors that are necessary for compressing the image;

second memory means, electrically connected to the variable-length code decoding means, for storing discrete cosine transform coefficients that are necessary for compressing the image; and image reconstructing means for reconstructing the image based on the plurality of parameters transferred from the first memory means and the second memory means.

7. An image decoding system for processing a continuous code series of compressed data including variable-length codes and fixed-length codes, the variable-length codes including an end portion containing end information and the fixed-length codes having a start portion containing start information, the image decoding system comprising:

a central processing unit having an input for receiving the continuous code series, the central processing unit extracting fixed-length codes from the continuous code series, extracting the start information from the fixed-length codes and generating a start signal therefrom, and processing data based on a value obtained from the continuous code series;

a variable-length code decoder having inputs for receiving the continuous code series and the start signal, the variable-length code decoder extracting variable-length codes from the continuous code series, the variable-length code decoder decoding variable-length codes in a self-running manner, in parallel with the processing of data in the central processing unit, upon receipt of the start signal;

a compare unit connected to the variable-length code decoder, the compare unit comparing the variable-length codes with a condition for stopping the self-running decoding of the variable-length code decoder; and an image reconstructing unit coupled to the variable-length code decoder and the central processing unit, the image reconstructing unit reconstructing images in accordance with parameters received from the variable-length code decoder and the central processing unit.

8. The image decoding system of claim 7, further comprising a register connected to the compare unit, the register storing information indicating the condition for stopping the self-running decoding of the variable-length code decoder.

9. The image decoding system of claim 8, further comprising:

a first memory connected to the central processing unit and the image reconstructing unit, the first memory storing a plurality of parameters, including motion vectors, that are necessary for compressing the images; and a second memory connected to the variable-length code decoder and the image reconstructing unit, the second memory storing discrete cosine transform coefficients that are necessary for compressing the images, wherein the image reconstructing unit reconstructs the images based on the parameters and coefficients stored in the first and second memories.

* * * * *